(12) United States Patent
Abadi et al.

(10) Patent No.: US 9,471,711 B2
(45) Date of Patent: Oct. 18, 2016

(54) SCHEMA-LESS ACCESS TO STORED DATA

(71) Applicant: TERADATA US, INC., Dayton, OH (US)

(72) Inventors: Daniel Abadi, New Haven, CT (US);
Daniel Tahara, Hartsdale, NY (US);
Thaddeus Diamond, New Milford, CT (US)

(73) Assignee: Teradata US, Inc., Dayton, OH (US)

( * ) Notice: Subject to any disclaimer, the term of this patent is extended or adjusted under 35 U.S.C. 154(b) by 212 days.

(21) Appl. No.: 14/034,074

(22) Filed: Sep. 23, 2013

(65) Prior Publication Data

US 2015/0088924 A1    Mar. 26, 2015

(51) Int. Cl.
  *G06F 17/30*    (2006.01)
(52) U.S. Cl.
  CPC ............................. *G06F 17/30979* (2013.01)
(58) Field of Classification Search
  CPC .............................................. G06F 17/30979
  See application file for complete search history.

(56) References Cited

U.S. PATENT DOCUMENTS

| | | | |
|---|---|---|---|
| 6,128,610 A * | 10/2000 | Srinivasan et al. | |
| 7,366,208 B2 * | 4/2008 | Bowes | 370/535 |
| 7,467,149 B2 * | 12/2008 | Gaurav et al. | |
| 7,966,343 B2 * | 6/2011 | Yang et al. | 707/791 |
| 8,862,625 B2 * | 10/2014 | Meiyyappan et al. | 707/791 |
| 2002/0178394 A1 * | 11/2002 | Bamberger et al. | 714/1 |
| 2007/0203941 A1 * | 8/2007 | Hongell et al. | 707/103 R |
| 2011/0218978 A1 | 9/2011 | Hong et al. | |
| 2011/0225167 A1 * | 9/2011 | Bhattacharjee et al. | 707/747 |
| 2012/0109935 A1 * | 5/2012 | Meijer | 707/713 |
| 2013/0013552 A1 * | 1/2013 | Eshleman et al. | 707/600 |
| 2013/0166568 A1 * | 6/2013 | Binkert et al. | 707/741 |

OTHER PUBLICATIONS djburdick, What column type should be used to store serialized data in a mysql db, Apr. 5, 2011.*
Zhang et al., Middleware Design for Intergrating Relational Database and NOSQL Based on Data Dictionary, Dec. 16-18, 2011.*
Leavitt, Will noSQL Databases Live Up to Their Promise?, 2010.*
Chasseur et al., Enabling Json Document Stores in Relational Systems, Jun. 23, 2013, Sixth International Working on the Web and Databases.*
Chasseur, et al., "Enabling JSON Document Stores in Relational Systems", *WebDB*, (2013).
Deutsch, et al., "Storing Semistructured Data with STORED", *Proceedings of the 1999 ACM SIGMOD International Conference on Management of Data*, SIGMOD '99, pp. 431-442, (1999).
Fagin, et al., "A Simplified Universal Relation Assumption and Its Properties", *ACM Transactions on Database Systems*, 7:343-360, (1982).
Maier, et al., "On the Foundations of the Universal Relation Model", *ACM Transactions on Database Systems*, 9:283-308, (1984).

* cited by examiner

*Primary Examiner* — Aleksandr Kerzhner
*Assistant Examiner* — Karina Levitian
(74) *Attorney, Agent, or Firm* — Mintz Levin Cohn Ferris Glovsky & Popeo, P.C.; Randy L. Campbell, Jr.

(57) ABSTRACT

A system, a method, and a computer program product for accessing stored partially structured data using a structure-based query language. A partially-structured data is stored in a data management system using at least one key-value pair. Using the data management system, a query of data is processed. The query is generated using a structured language.

25 Claims, 12 Drawing Sheets

{
  url:"www.sample-site.com",
  hits: 22,
  avg_site_visit: 128.5,
  country: "pl"
}

{
  date:"8/19/13",
  ip:"123.45.67.89",
  url:"www.sample-site2.com",
  hits: 15,
  owner: "John P. Smith"
}

| url | hits | avg_site_visit | country | date | ip | owner |
|---|---|---|---|---|---|---|
| www.sample-site.com | 22 | 128.5 | pl | | | |
| www.sample-site2.com | 15 | | | 8/19/13 | 123.45.67.89 | John P. Smith |

| _id | key_name | key_type |
|---|---|---|
| 1 | url | text |
| 2 | hits | integer |
| 3 | avg_site_visit | real |
| 4 | country | text |
| 5 | ip | text |
| 6 | owner | text |

404

| _id | count | materialized | dirty |
|---|---|---|---|
| 1 | 2 | t | f |
| 2 | 2 | f | f |
| 3 | 1 | f | t |
| 4 | 1 | f | t |
| 5 | 1 | t | t |
| 6 | 1 | f | t |

FIG. 9a

*Original query:*
SELECT url, owner
FROM webrequests
WHERE ip IS NOT NULL;
— 902

*Rewritten query:*
SELECT url, document_get(overflow, 'owner')
FROM webrequests
WHERE document_get(overflow, 'ip') IS NOT NULL;
— 904

*Rewritten query over partially upgraded column:*
SELECT coalesce(url, document_get(overflow, 'url')),
document_get(overflow, 'owner')
FROM webrequests
WHERE document_get(overflow, 'ip') IS NOT NULL;
— 906

SCHEMA-LESS ACCESS TO STORED DATA

This disclosure relates generally to data processing and, in particular, to accessing stored partially structured data, and, more particularly, to accessing stored partially structured data using a structure-based query language.

BACKGROUND

Software applications generate and require use of vast amounts of data that is stored in one or more back-end systems that allow data manipulation and management. For example, data can be stored in relational database systems that contain a plurality of tables, each having a plurality of columns. Data access or retrieval can be accomplished through issuance of searches and/or queries. Queries can be issued by user(s) and/or software application(s) and can be designed to retrieve data that may be requested for various reasons, such as, analysis, operations, etc. Queries can be written using a variety of computing languages and/or environments. One example of such a computing language is Structured Query Language ("SQL"). SQL includes a data definition language and a data manipulation language. SQL can further include data insert, query, update and delete, schema creation and modification, and data access control features. SQL queries implement a declarative SELECT statement, which retrieves data from one or more stored tables, or expressions. SQL queries allow the user to describe the desired data, in response to which a database management system ("DBMS") performs planning, optimizing, and performing the physical operations necessary to produce a resulting dataset.

Some databases that store data are implemented using a NoSQL or "Not Only SQL" methodology, which includes highly optimized key-value stores intended for simple retrieval and append operations, thereby providing significant performance benefits in terms of latency and throughput. NoSQL databases provide an ability to flexibly load, store, and access data without having to define a schema ahead of time. By removing this up-front data management effort, developers can more quickly get their application up and running, without having to worry in advance about which attributes will exist in their datasets, or the domains, types, and dependencies of those attributes. The proliferation of NoSQL databases has resulted in an increasingly large amount of production data being represented as incompletely structured data, for example using key-value and Java Script Object Notation, or "JSON," data models, instead of traditional relational models. Existing methods of analyzing such data are suboptimal.

Some NoSQL databases support primitives that enable the stored data to be analyzed. However, these primitives are not fully compliant with the SQL standard, rendering a large amount of third party analysis and business intelligence tools incompatible and unable to help with the analysis. Other NoSQL databases connect to Hadoop which enables Hadoop MapReduce and other execution frameworks within Hadoop to analyze data. However, connecting to Hadoop and enabling analysis via various projects in the Hadoop ecosystem has its own shortcomings. Either these projects provide non-SQL interfaces that have the same compatibility and skill-set shortcomings as the NoSQL primitives, or, if they do provide a SQL interface, they require the user to create a schema before the data can be analyzed via SQL, thereby eliminating a principle reason why the NoSQL database was used in the first place.

Accordingly, a need exists for a data analysis system that enables analytical queries implemented through structured query languages (such as SQL) to be issued over incompletely structured data (such as key-value or JSON data) without first having to define a schema.

SUMMARY

In some implementations, the current subject matter relates to a computer implemented method for accessing stored partially structured data using a structure-based query language. The method can include storing a partially-structured data in a data management system using at least one key-value pair and processing, using the data management system, a query of data, wherein the query is generated using a structured language. At least one of the storing and the processing can be performed using at least one processor of at least one computing system.

In some implementation, the method can include generating an interface containing a plurality of columns of data, wherein each column in the plurality of columns corresponds to a key in a plurality of stored key-value pairs, and generating, using the generated interface, the query of data using the structured language. The interface can be a tabular view presented to a user. The generated query can refer to at least one column in the generated interface. The column can refer to at least one of the following: a physical column stored in the data management system and a virtual column stored in an overflow column in the data management system.

In some implementation, the data management system can store the data using a plurality of keys and includes a plurality of physical columns and an overflow column. Each physical column can store data identified by a key in the plurality of keys and the overflow column stores data in a serialized format, the overflow column containing at least one virtual column.

In some implementations, the processing can include determining whether the queried data is stored in at least one of the following: at least one physical column in the plurality of physical columns and the overflow column, and generating, by the data management system, a dataset responsive to the query. The dataset can include data obtained from at least one of: the at least one physical column and the overflow column.

In some implementations, the processing can include materializing the at least one virtual column by extracting data corresponding to at least one key identified in the query.

In some implementations, the data management system can store data in a plurality of tables, each table in the plurality of tables containing logically associated data. The processing can also include joining the plurality of tables.

In some implementations, the data management system can store data in a single table containing an array of data objects within the data.

In some implementations, the data management system can store data based on at least one document schema. The document schema can identify the stored data based on at least one of the following parameters: at least one key corresponding to the data, a type of data, a number of occurrences of each key corresponding to the data, whether the data is stored in the at least one physical column in the plurality of physical columns, whether the data is stored in the overflow column, and a flag. The key corresponding to the data and the type of data can form a global dictionary table containing information about data previously stored in and/or recently loaded into a plurality of tables of the data management system. The parameters including the number of occurrences of each key corresponding to the data, whether the data is stored in the at least one physical column in the plurality of physical columns, whether the data is stored in the overflow column, and the flag can be specific to each table in a plurality of tables of the data management system. The flag can indicate that the data corresponding to a key in the plurality of keys is stored in at least one of the following: the at least one physical column and the overflow column.

In some implementations, the serialized format can include a header containing a number of data attributes stored in the at least one virtual column, an attribute identifier for each data attribute of data stored in the at least one virtual column, and an offset location of each value of data corresponding to each data attribute stored in the in the at least one virtual column.

In some implementations, the processing can also include de-serializing data stored in the serialized format in the overflow column by obtaining, based on a key contained from the received query, an attribute identifier corresponding to the data stored in the at least one virtual column, determining, based on the obtained attribute identifier, an offset location of each value of data corresponding to the obtained attribute identifier, and retrieving, based on the determined offset location, a value of data, wherein the retrieved data corresponds to the key contained in the received query.

In some implementations, the data can be loaded for storage in the data management system by validating syntax of the data being loaded into the data management system, and serializing the loaded data prior to storing the data in the data management system into the serialized data format, wherein the serialization of loaded data includes determination of at least one presence, type and sparsity of the keys in the loaded data.

In some implementations, the method can include determining, by the data management system, whether to store data stored in the overflow column in the at least one physical column. The determining can include determining at least one of the following a sparsity of at least one attribute, a purity of at least one attribute, a cardinality of at least one attribute, and an attribute schema corresponding to the data stored in the overflow column. The data stored in the overflow column and corresponding to attributes having low sparsity can be moved for storage into the at least one physical column. The data stored in the overflow column and corresponding to attributes having low purity can be retained for storage into the overflow column and is not moved for storage in the at least one physical column.

In some implementations, based on a determination that data corresponding to a key in the plurality of keys is stored in the at least one physical column and the overflow column, the data can be stored in the overflow column is moved for storage in the at least one physical column.

In some implementations, the processing can include determining whether the received query includes a reference to the at least one virtual column, modifying the reference to include a key extraction over the overflow column when the reference to the at least one virtual column is a key in the plurality of keys, wherein the overflow column stores data corresponding to the same key.

In some implementations, the data includes at least one of the following: a JavaScript Object Notation data, a binary-encoded serialization of JavaScript Object Notation data, Extensible Markup Language data, universal resource locator query string data, and Resource Description Framework data. The query can be a structured query language query.

Computer program products are also described that comprise non-transitory computer readable media storing instructions, which when executed one or more data processor of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 3a-b illustrate an exemplary JSON dataset and its table representation, according to some implementations of the current subject matter;

FIG. 4 illustrates an exemplary document schema, according to some implementations of the current subject matter;

FIGS. 9a-b illustrate an exemplary query rewriting, according to some implementations of the current subject matter;

DETAILED DESCRIPTION

Figure 1:
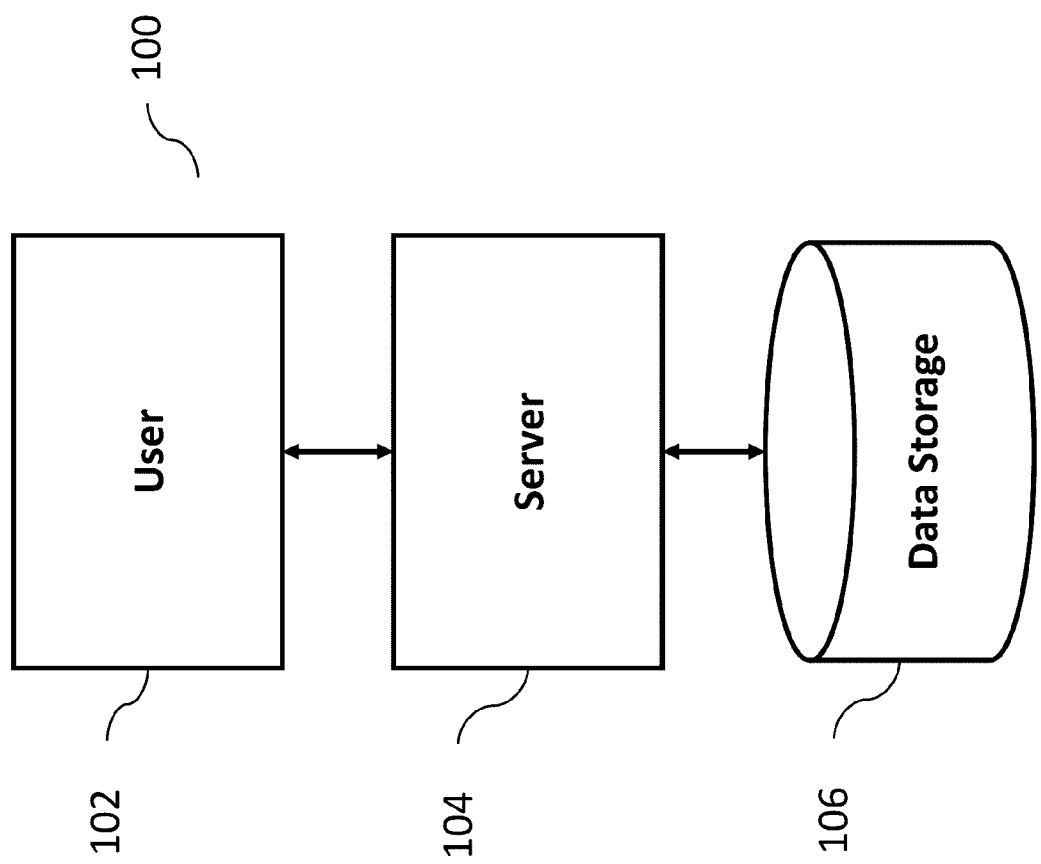
FIG. 1 illustrates an exemplary system for providing a schema-less access to a data storage, according to some implementations of the current subject matter.

In some implementations, the current subject matter can provide storage, analysis and/or access to partially-structured data that can be stored using key-value pairs in a data management system (e.g., a relational database management system and/or any other storage system, database system, etc.) using a query that can be generated using a structured language. In some implementations, some portions of the data can be stored in physical columns of a table in such system (each physical column corresponding to a single key in such dataset) and other portions of the data can be flattened into a serialized format and stored in at least one virtual column of the table (each virtual column containing data corresponding to multiple keys). The system provides a logical view of a universal relation of the dataset through a logical table that contains one column for each unique key in the dataset. Each key in the serialized data stored in the virtual column is displayed as a separate column in the logical table. Access to the data can be provided without requiring development of a query schema that is particular to the storage system where the data is stored (i.e., in a schema-less way).

In some implementations, the data can include any data that can be stored using a pre-defined structure (e.g., data can be stored in physical columns), any data that can be stored without defining a particular storage schema (e.g., data can be stored in a serialized format), and/or any other data that can be stored using a combination of a pre-defined structure and in an unstructured format, and/or in any other fashion. The data can be further stored using in a table based on a row-column format, where each column can correspond to a particular key contained in the data and each row can include values that correspond to a different keys in a related set of key-value pairs. For example, a document (or any other data) containing a plurality of values can be stored in a row of a table, where each value is stored based on a key corresponding to a column. Thus, each column in the table can include a value based on the key (which can include a NULL value, if no value is present corresponding to a particular key). The key-value pair storage structure can use keys that can already exist in the table and/or otherwise can be pre-defined (e.g., by an application, a software developer, etc.). Data that cannot be stored in a table having physical columns, can be stored in a serialized format, where the data values being stored are not being assigned to a specific physical column based on a key. This can occur in situations where no key yet exists that corresponds to a physical column in a table.

In some implementations, the current subject matter can provide for storing partially structured data in a database system, which can be parsed into a plurality of key-value pairs, using a plurality of rows and columns such that the partially structured data can be accessed (e.g., via an interface) using a structured query, where the partially structured data can be stored in a structured format, serialized format, and/or both. The structured query can be generated using a structured query language ("SQL"), XML Path Language ("XPATH") that is based on a tree representation of an extensible markup language ("XML") document, and/or any other structured and/or unstructured query language.

FIG. 1 illustrates an exemplary system 100 for providing a schema-less access to a data storage, according to some implementations of the current subject matter. The system 100 can include a client or a user 102, a server 104, and a unit for data storage 106. The server 102 can be a server that can allow the client or the user 102 to send a query or a request to obtain specific data. The server 102 can process the received query and determine how to obtain data from the data storage 106. The data storage 106 can be any data source or a plurality of data sources and can contain data that may be responsive to the client's query. The query can be a structured language query, for example using SQL, where the data storage 106 can include query-responsive data sources, such as, a relational database management system ("RDBMS"). The data storage 106 can include various types of databases (e.g., relational, multi-dimensional, etc.), various documents, and/or any other data (whether structured, unstructured or semi-structured), and/or any combination thereof.

In some implementations, the data storage 106 can contain tabular data, row-based data stored in a row format, column-based data stored in a column format, object-based data, and/or any other type of storage format data. The data storage 106 can also contain data that is indexed to assist in searching and retrieval. The data storage 106 can also store information about structure, relationships and/or meaning of data in the data storage 106.

The client and/or user 102 can be any user, a computing device executing a software application, a software application, and/or any other entity. The client/user can issue a query to the server 104 via appropriate user interfaces. The query can be processed and data responsive to the query can be generated. In the case of SQL queries, the query can contain various statements, such as SELECT, FROM, WHERE, etc. to identify which data is to be selected from which data store in the data storage 106. The data stored in the data storage 106 can be represented using a name-value pair, a key-value pair, a field-value pair, an attribute-value pair and/or in any other fashion. A data model can be implemented for storing the data that is represented in the above fashion, where all or part of the data model can be expressed as a collection of tuples <attribute name, value>, each element being an attribute-value pair. Depending on the particular application and the implementation chosen by program developers, attribute names may or may not be unique. A key can be a unique identifier for some item of data, and a value can correspond to either the data that is identified or a pointer to the location of that data.

Data can be loaded into the data storage using a loader (not shown in FIG. 1). In some implementations, the loaded data can contain JavaScript Object Notation ("JSON") data, binary-encoded serialization of JavaScript Object Notation ("BSON") data, Extensible Markup Language ("XML") data, and/or any other data. In some implementations, the current subject matter system 100 can also convert the data that is being loaded into a specific data format, including the formats identified above.

Figure 2:
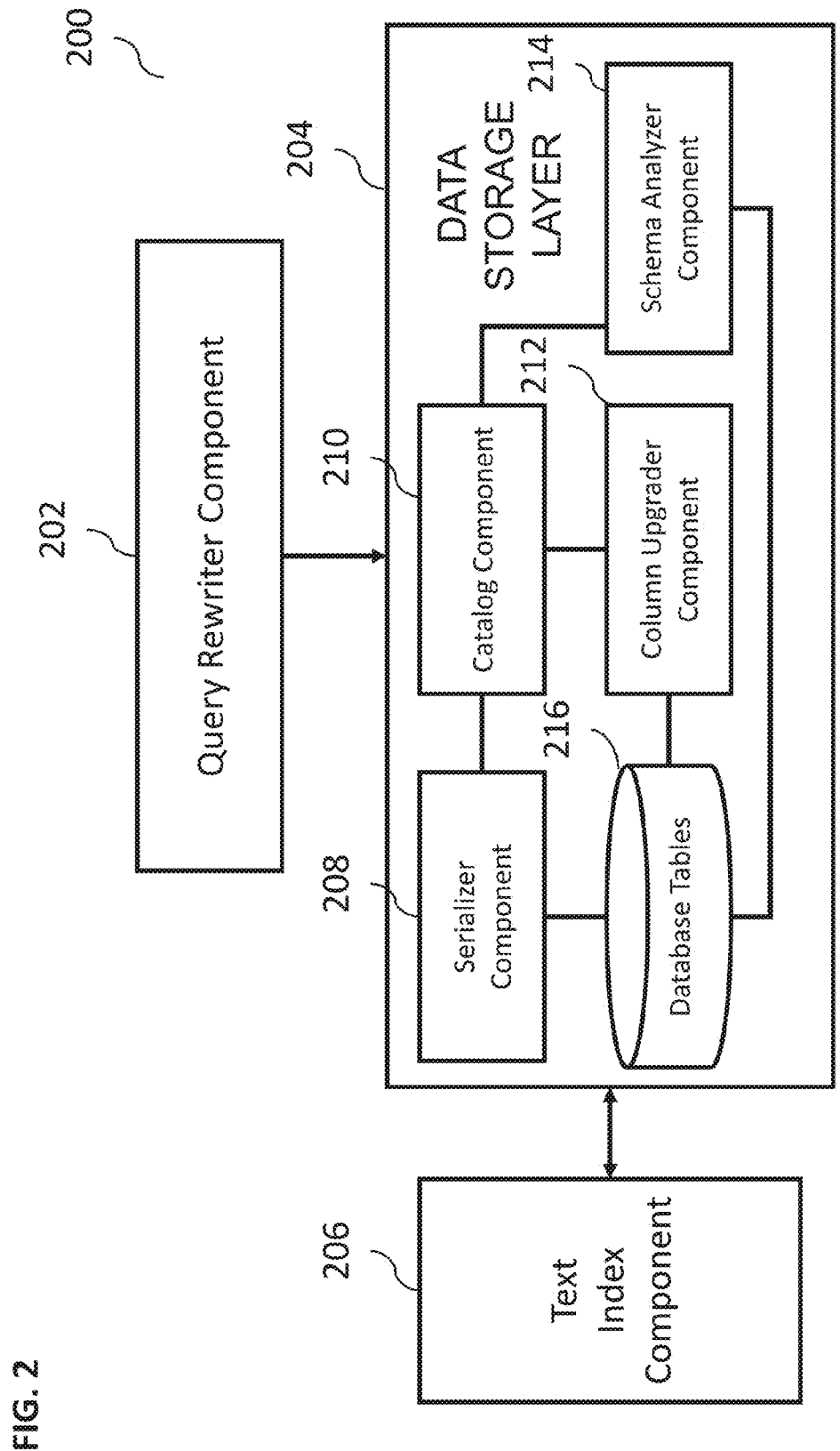
FIG. 2 illustrates an exemplary system for providing a schema-less access to the stored data, according to some implementations of the current subject matter.

FIG. 2 illustrates an exemplary system 200 for providing a schema-less access to the stored data, according to some implementations of the current subject matter. FIG. 2 provides additional detail for the components shown in FIG. 1. The system 200 can include a query rewriter component 202, a data storage layer 204, and a text index component 206. The query rewriter component 202 can be part of the client 102, the server 104 and/or the data storage 106 shown in FIG. 1. The data storage layer 204 can be implemented in the data storage 106 shown in FIG. 1. The text index component 206 can be implemented in the data storage 106 shown in FIG. 1 and/or be part of a metadata database, which can be a separate database and/or incorporated into the data storage 106 (not shown in FIGS. 1-2). In some implementations, the data storage layer 204 can also include a serializer component 208, a catalog component 210, a column upgrader component 212, a schema analyzer component 214, and database tables 216 that can contain various data.

In some implementations, the system 200 can receive data for loading into the data storage layer 204. A loader component (not shown in FIG. 2), can perform loading of the data and can also perform validation of data format of the data being loaded to ensure that the data being loaded can be properly stored in the data storage layer 204. Once the format has been validated, the loader component can pass the data to the data storage layer 204. The data storage layer 204 can then store the data using a current storage schema that exists in the data storage layer 204.

The data storage layer 204 can store individual keys associated with the data in columns that can correspond to the keys and/or in a serialized format. The data stored in a serialized format can be stored in at least one custom document overflow column. Such custom document overflow column can be created to accommodate data that cannot be placed into columns associated with specific keys in the data storage layer 204. The data can also be formatted to match the current storage schema of the data storage layer 204.

After the initial load, the data storage layer can also implement a background process that can aggregate various statistics about the individual attributes of the data and the dataset as a whole. These statistics can be used to optimize the underlying schema (i.e., which attributes to store in physical columns and which attributes to represent virtually). In some implementations, a column upgrader component 212 can perform a materialization (referred to as "upgrading) and dematerialization (referred to as "downgrading") of columns, extraction of data from the serialized form (i.e., from the document overflow column) and filling of the physical columns of tables stored in the data storage layer 204.

In some implementations, the system's catalog component 210 can maintain various statistics and information about where the data stored in the data storage layer 204 can be located. Such information can be used for the purposes of rewriting queries and resolving references to virtual columns. The query rewriting process can be performed by the query rewriter component 202 to rewrite a query received from the user 102 (shown in FIG. 1) so that the query returns correct data. Information in the catalog component 210 can be combined with various data summarization information stored in the text index component 206 for the purposes of optimizing the received query into a combination of user-defined functions ("UDF") over the overflow column, calls to search indexes, and projections over RDBMS columns. In some implementations, the overflow column can be a physical column inside the database tables 216 in the storage layer 204. The overflow column can include at least one virtual column that can be visible to the user. The user might not be aware of the existence of the overflow column. In some implementations, there can be one overflow column that can include one or more virtual columns. In some implementations, there can be more than one overflow column, which can include a plurality of virtual columns.

By translating queries over a virtual view of the data in which each attribute is its own column into queries over the underlying storage layers, the components 202-216 can provide an ability to access data that is stored individually in a structured physical column environment as well as data that is serialized or unstructured, which is stored in a virtual Column environment. The following discussion provides additional detail with regard to each of the components 202-216.

1. Data Storage Layer

In some implementations, the data storage layer 204 can include a standard relational database having a schema that can be determined dynamically and/or can be periodically updated as the system learns about the structure and access patterns of the data stored in the data storage layer 204. The data storage layer 204 can include the components 208-216 that can be used in performing storage of data in physical and/or virtual columns as well as during data retrieval, such as, in response to a query. Each of these components is discussed in more detail below.

In some implementations, the data storage layer can store data in physical columns contained in the standard relational database using keys associated with the data. Data that does not include a key that corresponds to at least one physical column can be stored in a serialized format in at least one virtual document overflow column. In some implementations, the data that is stored in such document overflow column can be upgraded or otherwise moved into one or more physical columns stored in the data storage layer 204.

In some implementations, the data model used to store data in the data storage layer 204 can include a storage schema. According to the schema, each portion of data (e.g., a document), can correspond to one row in the schema. The data can also include at least one key, which can be a top-level key, a nested key (e.g., a sub-key), and/or any other type of key. Each unique top-level key that is found in any of the documents can be exposed to the client as a table attribute. A client's query can access such tables using any conventional modes (e.g., SQL). Nested keys can also be exposed to the client as separate table attributes and can be concatenated with the parent key. FIG. 3a illustrates an exemplary JSON dataset 302 that can be shown to the user as a table 304 (shown in FIG. 3b). For example, a query SELECT url FROM webrequests WHERE hits>20 to the data storage layer 204, containing the dataset shown in FIGS. 3a-b, can return a set of values associated with appearances of the key "url" in objects with more than 20 "hits".

In some implementations, to create a mapping of document keys to a relational storage, the following methodologies can be used: (1) create a new column in the relational storage every time a new key is received or processed in the data received for storage and (2) store data in a serialized format in a single column, which can be transparent to the user. The first option can provide a simpler system design for storing data, however, when using this type of system, it may be difficult to handle datasets with large numbers of potentially sparse attributes. In particular, due to the catalog and system overhead of defining large numbers of columns in a table, many conventional RDBMS systems place a hard limit on a number of columns that a user can define in a single table. Although the column number limitation can be circumvented by vertically partitioning a table (or using a column-store), the cost of reconstructing data tuples from millions (or billions) of columns on the fly (e.g. for SELECT* SQL queries) can become prohibitively high and can further limit interactivity of queries. Additionally, many databases systems can also require at least one byte per null value, and thus, over a sparse dataset, this storage overhead can significantly increase the number of disk accesses, which might be necessary to retrieve records, and can further degrade performance.

Using the second option, storage of data in a serialized form in a single column can solve the number of columns limitation, but might degrade an ability of an RDBMS system optimizer to produce efficient query plans, because the query optimizer cannot maintain statistics on an attribute-level. Similarly, the lack of explicit columns might prevent use of database indexes, which can be useful for highly selective queries or joins over a large table.

In some implementations, the data storage layer 204 can implement a combination of the above storage options and can create columns to store some data that is associated with some attributes found in the received data and store other data in a serialized format in a document overflow column. The data stored or to be stored in a physical column that already exists in the storage (e.g., RDBMS) can be referred to as data stored in an upgraded column and data that is stored or to be stored in a document overflow column (i.e., a column created for data for which no physical column exists or can be found in the storage) can be referred to as data stored in a virtual column. The virtual column, while having no physical existence in the storage schema, can be queried in the same way as any physical column corresponding to an attribute in a relational object model. In some implementations, virtual columns can be materialized (i.e., a view can be created for the columns) at query time by extracting corresponding value(s) from the document overflow column for each record.

In some implementations, the data storage layer 204 can store the data in a single table containing a plurality of columns, where one row in the table corresponds to a single document. Further, the data storage layer 204 can provide storage of data by grouping data into logical groups, which can be formed within the set of documents. The user can assign or store such groups in separate tables that can be joined together at query time using standard SQL join semantics. Further, if a document consists of an array of objects, the document can be placed in its own separate table, where each row of the table corresponds to one element of the array. In some implementations, grouping of data can exist in physical and/or virtual columns or both. In general, as stated above, a single document (which can correspond to a physical row in a table) can include a series of key-value pairs. Some of the keys of these key-value pairs can correspond to physical columns. In this case, the value of that key-value pair can be stored inside a physical column corresponding to that row. Other values that do not correspond to keys having corresponding physical columns can be stored in virtual columns of the overflow column. In this case, such keys can be considered as corresponding to virtual columns. As such, both the key and the value can be stored in the overflow column using the serialization format, as discussed below. The groups discussed above can include groups of similar documents that are grouped together in separate tables, where each of these tables can have physical and/or virtual columns.

For example, assuming that there exists a group of 20 documents, each of which can include 9 key-value pairs such that 7 of the keys are the same for each of the 20 documents. Then, the current subject matter system can create a table that can include 20 rows (one for each document in the group) and 7 physical columns (for each of the 7 shared keys across the 20 documents). The overflow column can only store the remaining two key-value pairs for each of these 20 documents. One of the advantages of creating such storage methodology is that the 7 physical columns of this 20-row table can be "dense" (i.e., no NULL values) since each document in this group has values for those 7 keys. However, if the 20 documents are within a 1000-document dataset and the remaining 980 documents in that dataset do not have values for the 7 keys above, and a separate table was not created, the 7 keys may not be stored in physical columns (however, in some implementations, the 7 keys can be stored in physical columns). This is because the 7 keys are too sparse (i.e., only 20 out of 1000 documents have values for those keys). As such, the 7 keys are stored in an overflow column. Thus, by creating a separate table, the current subject matter allows less data overall to be stored in overflow columns. Another example of this storage methodology includes use of an array of objects. In this case, every element of the array can include at least one of the same set of key-value pairs, thus, the array of objects can be put in a separate table and can include all keys corresponding to physical columns.

2. Document Schema

In some implementations, the data storage layer 204 can include the catalog component 210 that can store information about a document schema that can be used for storing data in the data storage layer 204. The document schema can be used in addition to an "information schema", which is a schema defined by the American National Standards Institute ("ANSI") standard as a set of read-only views and provides information about all of the tables, views, columns, and procedures stored in a relational database. Knowledge of how the data is stored and organized in the data storage layer can be important in finding and obtaining correct data in response to a query. In some implementations, the current subject matter system 200 can be configured to maintain a record of which keys are present in the data stored in the data storage layer. The catalog component 210 can store such information, including attribute names, types, and method of storage (i.e., whether data is stored in an upgraded column or a virtual column). This can provide an efficient way for responding to queries, retrieving appropriate data, performing aggregations over a dataset, if any, and/or executing any other functions that may be related to data storage, maintenance, organization, manipulation, etc.

In some implementations, the document schema contained in the catalog 210 can include information relating to at least one of the following: which keys have been observed, the corresponding type information that has been derived from the stored data, whether or not the corresponding attributes are stored in a virtual column or in an upgraded column, a number of occurrences of each key, whether the column is upgraded or virtual, and whether there is a dirty flag. In some implementations, a dirty flag can indicate whether data associated with a particular key is stored in both a physical column and in the overflow column. This can occur as a result of some data associated with a particular key being stored in a physical column during a prior load while incoming or new data associated with the same key being loaded into a virtual column (only to be upgraded for storage into the physical column later on).

In some implementations, the document schema can be divided into two parts. FIG. 4 illustrates an exemplary document schema 400 according to some implementations of the current subject matter. The first part 402 can include a global list of attributes appearing in any documents across all relations as a triple containing: an identifier ("id"), a name, and a type. For example, an attribute having an id "1", has a key name of "url", and a key type "text". In some implementations, the global table can aid data serialization (as discussed below) by serving as a dictionary table that can assign attribute identifiers to every attribute name, thereby providing a more compact data representation whenever a particular attribute is referred to inside the data storage layer 204.

The second part 404 the document schema 400 can be maintained on a per-table basis (instead of globally across all tables). The second part 404 can include information about a count for a particular attribute (i.e., a number of times a particular attribute is found across all documents stored in the table), whether the attribute is stored in a virtual or physical column, and whether a dirty flag has been set. For example, data associated with attribute identifier "1" appears twice (i.e., count="2") in the documents stored in the table, and the key can be stored in a physical column in the table, which is indicated by "t" ("true"), and all values associated with this key can be stored in the correct physical column (none are in the overflow column), which is indicated by a dirty flag "f" ("false") being set (as discussed below).

In some implementations, the combination of parts 402 and 404 can provide a complete characterization of the data stored in the data storage layer 204, thereby allowing a query rewriter component 202 to resolve references to virtual columns into statements that match the underlying RDBMS schema.

3. Serializer Component

Figure 5:
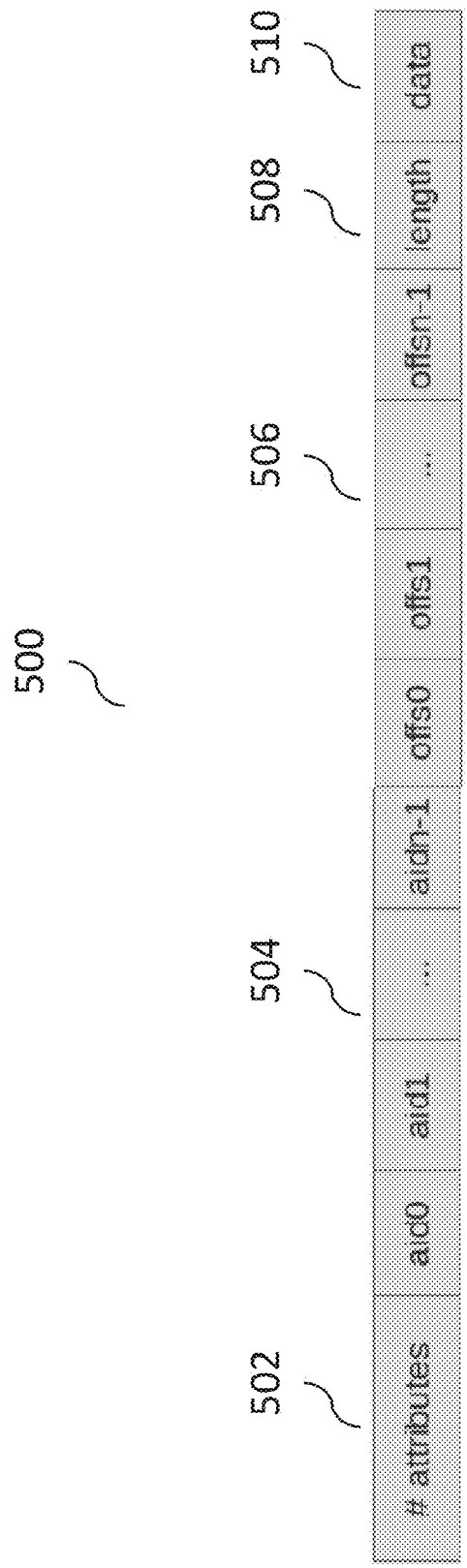
FIG. 5 illustrates an exemplary serialization header, according to some implementations of the current subject matter.

In some implementations, the data storage layer 204 includes a data serializer component 208 for converting data that cannot be immediately placed into one or more physical columns in the data storage layer 204, into a serialized format for storage in the overflow column. To store data in a serialized format in the overflow column, the data being stored can be analyzed and, based on the analysis, can be assigned a virtual serialization header. FIG. 5 illustrates an exemplary serialization header 500 according to some implementations of the current subject matter. The header 500 can indicate the number of attributes 502 ("#attributes"), an attribute identifier 504 ("aid#"), a location or offset of each attribute 506 ("offs#"), an indication of the length 508 ("length")—the combined size of all the attributes, and data fields 510 ("data"). The number of attributes 502 can indicate a number of attributes contained in the data stored in the overflow column. The attribute identifiers 504 can identify each attribute. The attribute identifiers 504 can include a sorted sequence of integers corresponding to the attribute ids, which can be retrieved from the document schema's global attribute table indicating the specific keys present. The offset 506 can indicate where in the data a particular attribute can be found. The offset 506 can correspond to byte offset of each attribute's value within the data. In one embodiment, the length of each attribute can be determined indirectly, for example by combining the offset information of one attribute with the offset information of the next attribute. The items contained in locations 502-508 can contain metadata associated with the actual data. The data field 510 can contain the actual data being stored. The actual data can be stored in a binary representation of the actual data. The separation of the document metadata can allow identification of the absence of a key without reading the entirety of the data and a fast retrieval of the typed value for an existing key.

Inclusion of the above header allows the system 200 to properly rewrite an incoming query to include references to the virtual column (along with references to physical columns) based on the information contained in the header 500. Such rewriting can minimize the amount of processing that may be required to extract a value from a given record's overflow column. Thus, addition of the header items 502-508 and storage of the actual data 510 in a binary format can complete storage of data in a serialized format by the serializer component 208.

In some implementations, the header can start with a number of attributes, which can correspond to the number of attribute ids and the number of offsets. The separate fields in the header for attribute ids and offsets can allow the current subject matter system to distinguish between these fields when processing data. The length attribute can be a total size of the serialized data (e.g., which can be determined by adding all lengths of data for all of attributes). When new data is received in for a particular document, it can be possible to update the header (and appropriate data) directly. The header can be stored with the data inside the overflow column.

In some implementations, the serializer component 208 of the data storage layer 204 can use a desired key and type to de-serialize the data stored in a serialized format. The key and type can be inferred from the query, read from the document schema, or assumed to be a text representation). The component 208, using the key and type, can retrieve the corresponding attribute id from the document schema. For each record, it can then perform a binary search on the attribute id list in the header, and, if the id is present, can retrieve its offset from the list that follows the attribute ids. Using the offset information combined with the offset information of the next attribute, the component 208 can retrieve the value and return the data in its appropriate type.

4. Data Loading

In some implementations, data can be loaded into the data storage layer 204 based on the underlying schema of the data storage layer 204. The schema can be updated over time with new storage columns, keys, etc. The current subject matter system 200 can allow for efficient loading of data using the up-to-date document schema, which can further allow for an efficient way of retrieving data in response to queries.

Figure 6:
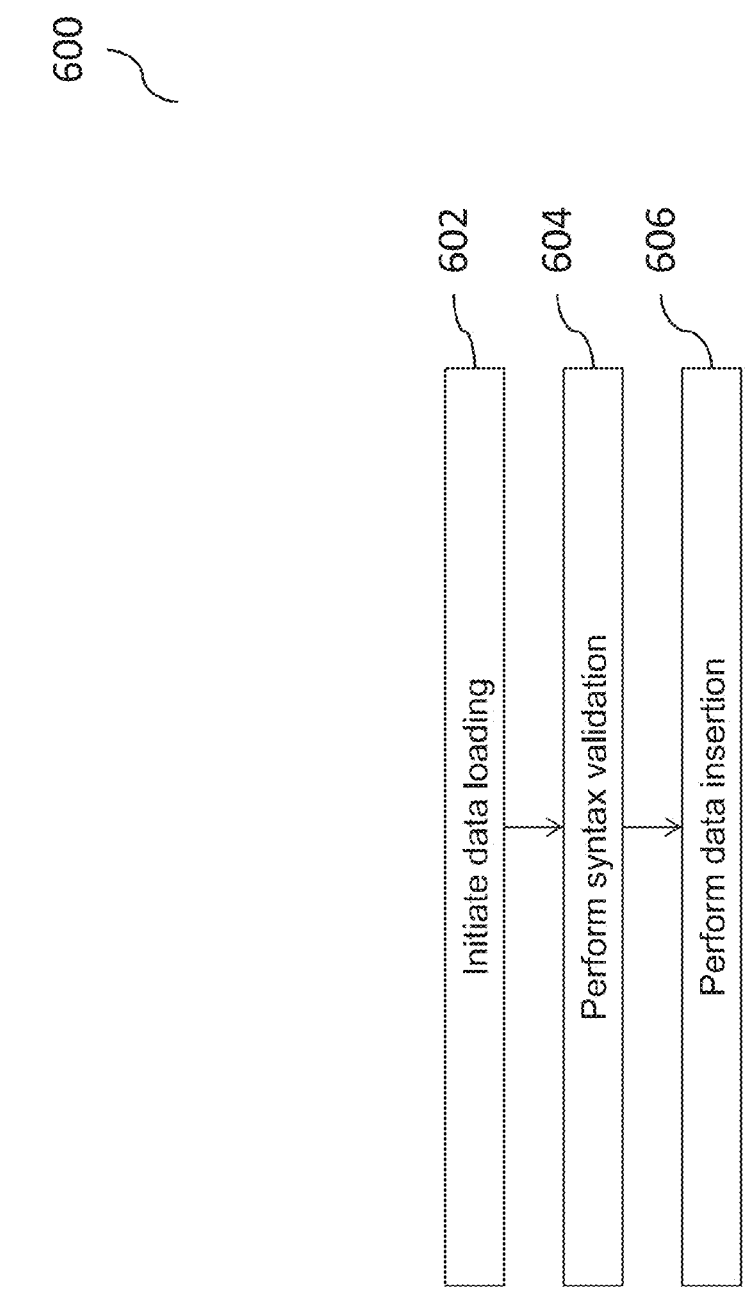
FIG. 6 illustrates an exemplary data loading process, according to some implementations of the current subject matter.

FIG. 6 illustrates an exemplary data loading process 600, according to some implementations of the current subject matter. After initiation of data loading, at 602, the system 200 can perform syntax validation of the data, at 604, and insertion of data into the data storage layer, at 606.

To perform syntax validation, at 604, the system 200 can include a data loader component (not shown in FIG. 2) that can parse each record in a collection of data objects to ensure that its syntax is valid. The syntax can be determined based on the document schema and data that is stored in the data storage layer 204. For example, if the data that is stored in the data storage layer 204 is stored in a JSON format, the data loader component can ensure that the data that is being loaded conforms to the JSON format specifics. Once the syntax is confirmed, the data can be serialized, as described above. As data serialization takes place, the loader component can aggregate information about the presence, type, and sparsity (or density) of the keys appearing in the data being loaded. Malformed records can be placed into a "rejects file" without aborting the load. In some implementations, the rejects file can include a file that can be created on the fly and can be returned to the user after the load is completed. After validation, the document data can be loaded in its serialized form into the overflow column, and attribute information can be inserted into the document schema as described above.

In some implementations, insertion of data into the overflow column of the data storage layer 204, at 606, can occur regardless of the current document schema of the document storage layer 204. In some implementations, all new data can be loaded into the overflow column, even if some data keys have been upgraded to occupy physical columns. The data that is being loaded into the overflow column and having a particular key that also corresponds to at least one physical column in the data storage layer 204 can be assigned a dirty flag (as shown in FIG. 4). Subsequent to loading, the data that has been assigned a dirty flag can be moved or upgraded to a physical column in the data storage layer 204. Such loading process can provide for a data loading process that is substantially schema-agnostic, because two separate loads into the same user-visible table might not be into the same underlying system table. Since the entire dynamic schema is designed to be transparent to the user, the load process can ensure a consistent user experience regardless of the schema chosen by the system's backend.

5. Schema Analyzer Component

In some implementations, the data storage layer 204 can include a schema analyzer component 214 that can evaluate (e.g., periodically, automatically, or based on a specific schedule, etc.) the current document storage schema in order to determine the proper distribution of physical columns and virtual columns. This can be done for the purposes of selecting which columns to upgrade, and to minimize the overall cost of having to materialize virtual columns at query time rather than storing them as upgraded columns.

Based on information that can be collected during the initial data loading process, the schema analyzer component 214 can determine attribute sparsity, purity (i.e., a quantity inversely proportional to the number of type exceptions or malformed attribute values for a given key), cardinality, and the current schema of the underlying relation. Attributes having a lower sparsity (i.e., frequently appearing in the data) and high purity can be upgraded from a virtual column to a physical column, whereas attributes that are particularly sparse or impure can remain stored in the at least one virtual column. For highly sparse attributes, the system 200 can push down the received query for processing by the external text index component 206, retrieve corresponding attribute ids and then use the set of retrieved attribute ids as a WHERE filter to the received query. This can minimize the number of overflow columns that the system 200 might need to process.

The following is non-limiting example of attribute sparsity. For the purposes of the example, it is assumed that a sparsity of a first attribute is 90% (i.e., 9 out of 10 documents do not include values for the attribute), and a sparsity of a second attribute is 50% (i.e., half of all documents have values for the attribute). The second attribute can be a better candidate for a physical column, as there would not be as many NULL values associated with it (i.e., a NULL value is placed in a physical column for a particular row if the corresponding document for that row does not have a defined attribute).

The following is non-limiting example of purity. For the purposes of this example, it is assumed that a first attribute corresponds to 95% integer values and only 5% of values that are not integers, a second attribute corresponds to 90% decimal number values and only 10% of values that are not decimal numbers, a third attribute corresponds to half integer values and half string values. The third attribute can be considered to be less pure than the previous two attributes since it is unclear which type the column(s) corresponding to the third attribute should be. Thus, the first two attributes can be considered to be more pure and hence, better candidates for an upgrade to physical columns (also, the first attribute corresponding to 95% purity is better than the second with 90% purity).

The following is a non-limiting example of cardinality. For the purposes of this example, it is assumed that a first attribute has 10 unique values (i.e., it has a cardinality of 10) and a second attribute has 10,000 unique values. The first attribute can be a better candidate for a physical column upgrade since it is more compressible.

6. Column Upgrader Component

Figure 7:
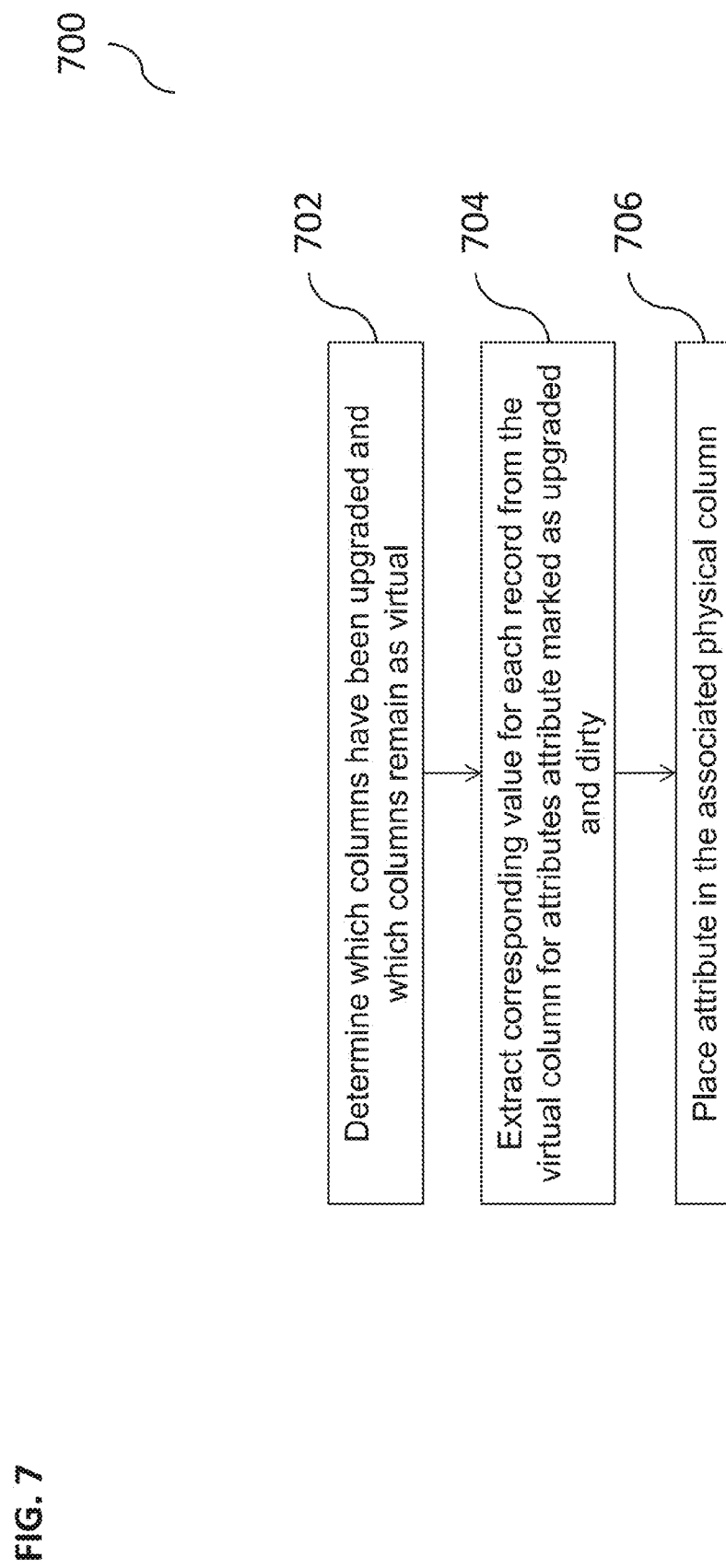
FIG. 7 illustrates an exemplary column upgrade process that can be performed by the column upgrader component of the system shown in FIG. 2, according to some implementations of the current subject matter.

In some implementations, the data storage layer 204 can include a column upgrader component 212 that can perform maintenance of the document schema of the data storage layer 204. FIG. 7 illustrates an exemplary column upgrade process 700 that can be performed by the column upgrader component 212, according to some implementations of the current subject matter. To initiate the process 700, the column upgrader component 212 can analyze the document schema for updates that may have been performed, and determine which columns have been upgraded and which columns remain as virtual, at 702. Upon finding that an attribute that is marked as upgraded and dirty (i.e., having a dirty flag indicating that new data corresponding to that attribute has been loaded since the creation of the upgraded column), the column upgrader component 212 can extract the corresponding value for each record from the overflow column, at 704, and place it in the associated physical column, at 706. in some implementations, the schema analyzer component 214 can determine virtual columns (that can be stored in an overflow column) that should be upgraded to physical columns. When it determines that virtual column should be upgraded to a physical column, it can both create the physical column and set a dirty flag for the associated key in the document schema to "t" (true). The column upgrader component can then move data from the overflow column to the newly created physical column.

In some implementations, just as columns may be upgraded, infrequently queried columns or columns that become more sparse or impure with a subsequent load can be downgraded. Such a downgrade may be appropriate, for example, where the total number of columns currently defined for a table are limited.

There is the potential for problems with a simultaneous load and column upgrade, since the column upgrader sets the dirty flag to false upon completion of the upgrade. If an upgrade were to begin while a load was already in progress and also finish after the load, it would incorrectly overwrite the value of the dirty flag. In order to prevent this occurrence, the system 200 can implement explicit, full table locking on the relations in the document schema. Both the loader component and the column upgrader component will attempt to obtain locks on a given table, and if ever a loader requests a lock held by the column upgrader component, the column upgrader component can immediately abort its transaction and return the lock for use by the loader.

7. Query Transformation Component

In some implementations, it might be necessary to convert an incoming query directed to the data storage layer 204 to an appropriate form so that it complies with the document schema of the data storage layer 204 and retrieves correct data. For example, the data storage layer 204 can be configured to store data using a data model that includes JSON keys that are stored as a dynamic combination of upgraded and virtual columns, and thus, a query transformation might be necessary to convert a user's query over the virtual schema into a form that matches the underlying schema of the data storage layer 204. The query transformation can be performed by the query rewriter component 202 (shown in FIG. 2).

Figure 8:
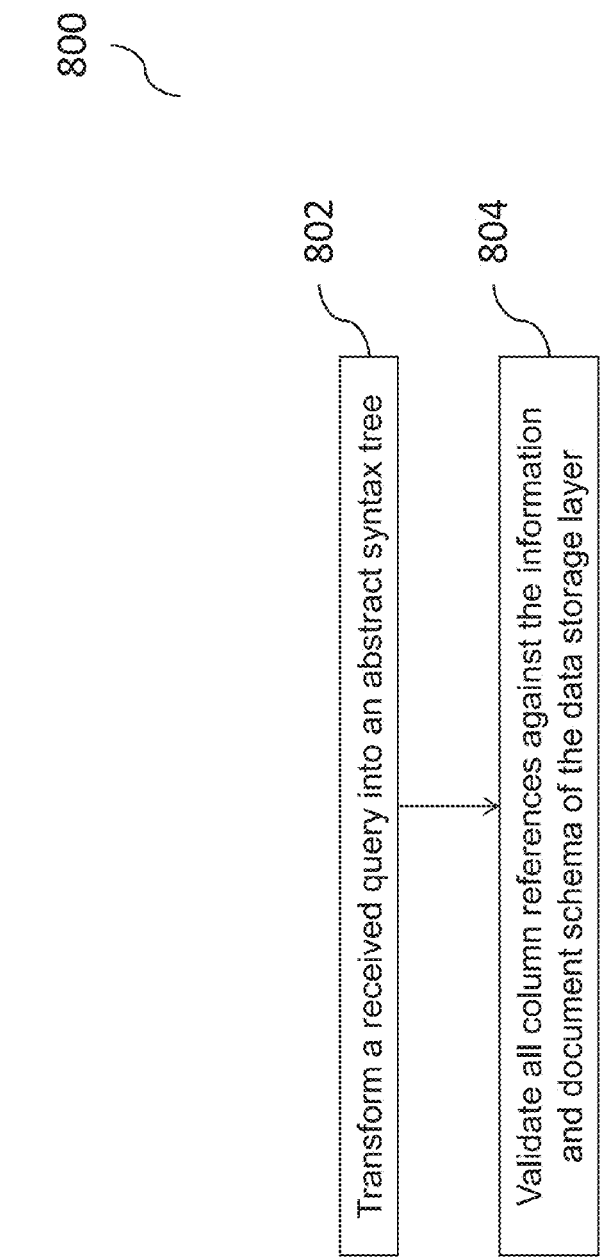
FIG. 8 illustrates an exemplary query transformation process performed by the query rewriter component of the system shown in FIG. 2, according to some implementations of the current subject matter.
Figure 9B:
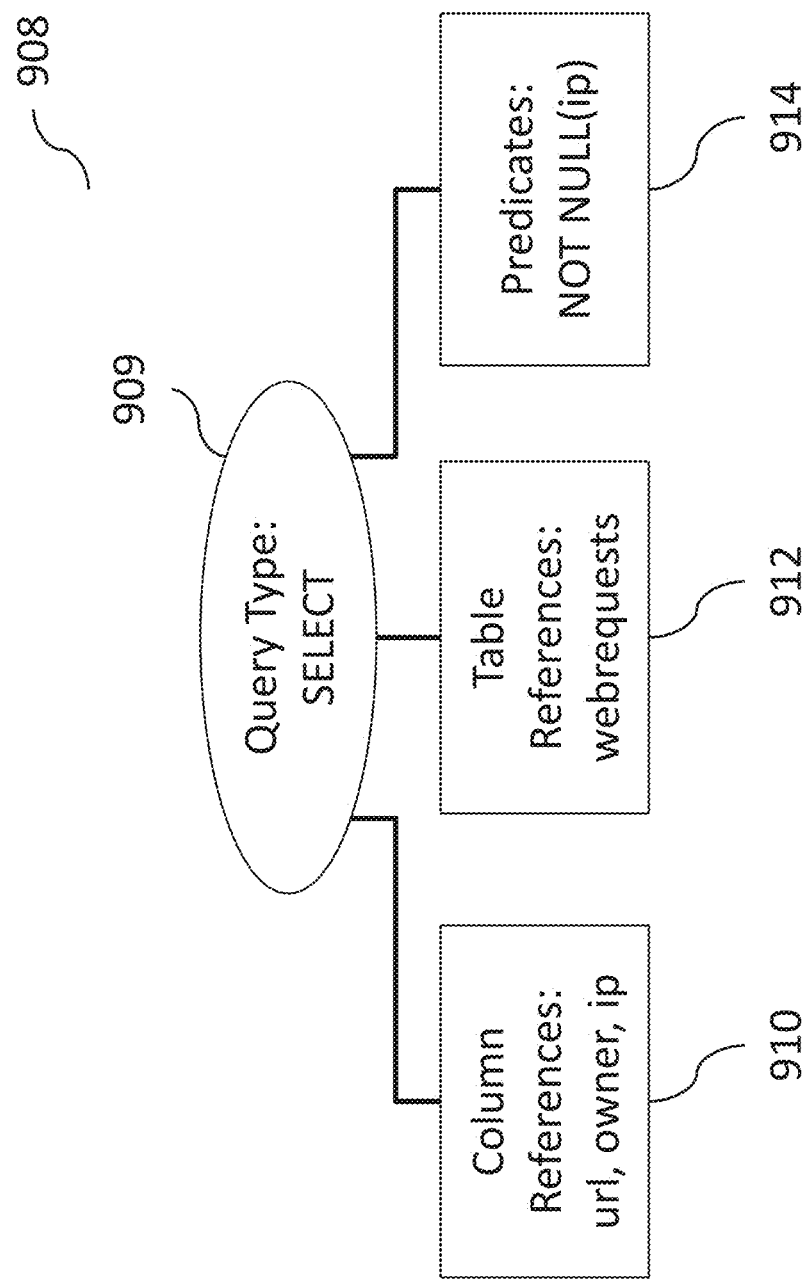

FIG. 8 illustrates an exemplary query transformation process 800 performed by the query rewriter component 202, according to some implementations of the current subject matter. At 802, the query rewriter component 202 can transform a received query into an abstract syntax tree. An exemplary abstract syntax tree 908 of the query 902 (shown in FIG. 9*a*) is shown in FIG. 9*b*. The abstract syntax tree 908 can include a mapping between a lexical structure and logical components of the query, including the operation type 909 (e.g., "SELECT"), the columns 910 (e.g., "url", "owner", "ip") and relations 912 (e.g., "webrequests") referenced by the query, as well as any predicates 914 (e.g., "NOT NULL(ip)") or other database operations to be performed on the data returned by the query. Referring back to FIG. 8, at 804, the query rewriter component 202 can examine the resulting abstract syntax tree for column references and then validate all column references against the information schema of the data storage layer 204. Any column reference that cannot be resolved, whether because it references a virtual column and/or because it refers to an upgraded, but dirty, column can be rewritten by the query rewriter component 202 into a form discussed below.

FIGS. 9a-b illustrate an exemplary query 902 that is rewritten into queries 904 and 906. The original query 902 that can be received by the query rewriter component 202 can call for obtaining data having attributes "url" and "owner" from a table of "webrequests" where an "ip" address does not have a NULL value. In order to include information from the document overflow column (i.e., virtual column), for example if the attributes or keys "owner" and "ip" are stored in the virtual column, the query 902 can be rewritten into query 904. In some implementations, the query rewriter component 202 can use the document schema (as shown in and discussed in connection with FIG. 4 above) to determine keys "owner" and "ip" are contained in the virtual column(s). If the materialized flag is set to "f" for the "owner" and "ip" keys, the query rewriter component 202 can determine that the column is a virtual column and that the query rewriter component needs to perform a rewrite of the query to transform it into query 904, as shown in FIG. 9a. The query 904 can include a reference to a document overflow column that can contain information with regard to the "owner" attribute (i.e., SELECT url, document_get (overflow, 'owner')). To account for any values of the corresponding ip addresses in the virtual column (i.e., by including a reference to "overflow" in the query), the WHERE clause is rewritten as well to indicate that document_get(overflow, 'ip') IS NOT NULL. Further, in order to retrieve data from a partially upgraded column (in this example, the "url" column can be partially upgraded), the query 904 (and hence, the query 902) can be rewritten as the query 906. The query 906 can coalesce or otherwise join data that can be contained in both the physical "url" column, and/or any values for the "url" key that can be contained in the overflow column and not yet moved to the physical column. This can be accomplished by revising the original SELECT statement into SELECT coalesce (url, document_get(overflow, 'url')), document_get(overflow, 'owner'). The rewritten query 906 will look into both the physical "url" column and the overflow column for "url" values. However, it will only look in the overflow column for values of the "owner" and "ip" keys, since there is no physical column associated with these keys in the example shown in FIG. 9a. As shown in FIG. 9a, in the case of a virtual column (query 904), the column reference can be transformed by the query rewriter component 202 to a key extraction over the document overflow or virtual column, and in the case of a dirty column (i.e., the one with a dirty flag) (query 906), the column reference can be transformed to a SQL COALESCE function over the physical column and key extraction.

In some exemplary implementations, to preserve the type information provided in the initial data serialization, the key extraction can include a type argument and return either the appropriately typed value, and/or, in the case of a type mismatch, a NULL value. The typing can preserve the full flexibility offered by certain data syntax (e.g. JSON), that does not enforce type constraints on keys across objects. If an integer type is implicitly specified by a SQL query, the statement may not generate an error if half of the values are integers and half are strings. For example, it may return a correct result for the values of the type specified. In certain embodiments, in such a situation, the system may also log a notice that the query resulted in a potential type mismatch. Further, since a column projection (except when used as the argument to an aggregate or other function) does not place any type constraints, the COALLESCE transformation described above with regard to query 906 can allow the system to return values of multiple different types.

8. Inverted Index and Text Search

In some implementations, the system 200 shown in FIG. 2 can provide SQL querying over structured, semi-structured (i.e. incompletely structures), unstructured, and/or any other data sets. Further, the system 200 can also provide an external text index over the data stored in the data storage layer 204. An inverted text index can tokenize the input data, which can be separated into individual documents, and then compile a vector of terms together with a list of document ids corresponding to the documents that contain that term. Due to its highly specialized structure, an inverted text index can provide an extremely fast performance over many different types of queries, with most implementations of text indices including internal mechanisms to offer performance range queries, partial matching, fuzzy matching, and/or any other type of matching.

Further, text indices can support division of documents into strongly typed fields, which can correspond to any attribute of the document specified by the user. An external index can allow the system 200 to index virtual columns as strongly typed, searchable fields. The text index can allow system 200 to efficiently respond to queries over virtual columns, since it might be difficult to create a database index on a virtual column serialized in the overflow column when the physical representation of the virtual column is opaque to the optimizer. For example, when the optimizer attempts to compile the unique values in order to create a B-tree index, it can treat the overflow column as a single logical column and thus, can only recognize values that are the combination of all of the virtual columns in the overflow column. For the same reason, the optimizer will be unable to estimate the selectivity of queries over virtual columns, which can lead to suboptimal query plans.

However, if at a load time, the data storage layer 204 (shown in FIG. 2) sends its overflow data to the text index component 206 serialized as a set of key, value pairs associated with a specific document id. For example, if the relation in FIG. 3b was backed by a relation in which the key avg_site_visit was stored as part of the overflow column, the text index component 206 can compute a special lexical representation of the floating point values that can allow it to respond to predicates ranging from strict equality to range queries. If a predicate was particularly selective, then the result set of documents can be first computed using the text index component 206, and then used as a filter on the remainder of the query processed in the database. This can obviate a full table scan when a predicate returned only one or two matching documents, thereby offering a significant speedup to the overall system.

In some implementations, the system 200, rather than checking each record's document overflow column for the presence and value of an attribute, can delegate a predicate to the text index and use the results of the search as a filter over the original relation. In cases where a query over a virtual column is highly selective or an attribute is very sparse, this can significantly reduce disk I/O and allow the system 200 to more quickly respond to the query.

In some exemplary implementations, a conventional open source enterprise search platform (such as a Solr® search platform developed by Apache Software Foundation, Forest Hill, Md., USA, which includes full-text search, hit highlighting, faceted search, dynamic clustering, database integration, rich document handling, distributed search and index replication, etc.) can be used to index not only values segmented by a key, but also the original document itself. This can enable an application of predicates and full text search simultaneously over all columns, by specifying the search filter to be applied over the 'full text' field of a document indexed externally. An exemplary query using such platform can be represented as follows:

```
SELECT *
FROM webrequests
WHERE matches('*', "my full text query")
```

The full text search capability can then form the basis of a far broader set of analysis on the data than allowed by a traditional structured query-based RDBMSs such as SQL, because it can enable system 200 to offer a more expressive set of predicates. Even discounting the added expressivity and performance benefits to queries over virtual columns, the text index can also boost performance for standard queries over upgraded columns.

9. Exemplary Implementation

The inventors of the current subject matter experimentally implemented the above system in the following manner. It should be understood that the discussion of this experimental implementation is provided below for exemplary, illustrative purposes and is not intended to limit the current subject matter in any way.

The storage layer of the system 200 was implemented using PostgreSQL® (an open source object-relational database management system ("ORDBMS") developed by PostgreSQL Global Development Group). PostgreSQL provided an extensible platform on which further infrastructure was built to improve performance of analytic queries. PostgresSQL was used to accomplish a task of storing key-value data, which contained a high percentage of sparse attributes (because PostgreSQL handles null values efficiently). Each tuple that was stored by PostgreSQL had a varying size based on the attributes actually present, rather than being stored in a fixed, pre-allocated block of memory based on the schema. Thus, a null value, rather than filling the entire width of a column, took up just a single bit in the tuple header. (Every attribute that could exist—whether null or not—took up a bit in the header, so having millions of columns—even if PostgreSQL allowed it—would make the header prohibitively large).

Since PostgreSQL uses multiversion concurrency control ("MVCC"), which is a concurrency control method commonly used by database management systems to provide concurrent access to the database and in programming languages to implement transactional memory to handle concurrency, updates caused the entirety of the row to be rewritten, rather than simply that attribute itself. Thus, during experimentation, updates were equivalent to insertions.

Both the schema analyzer component 214 and the column upgrader component 212 were implemented as PostgreSQL background processes. The management of the background processes was delegated entirely to the PostgreSQL server backend, which both simplified the system model and offered low-level access to system features. The data serializer component 208 was implemented as a native PostgreSQL data type by defining functions to convert to and from a string representation of the JSON data.

Using a native data type, as opposed to wrapping a serializing function around a plain text column, provided better control over the byte representation and ultimately reduced the space cost of the document overflow column.

For the external text index, Apache Solr was used to provide an inverted search index based on Apache Lucene, which is optimized for full text search and data discovery. The Solr API was exposed to PostgresSQL using a user defined function ("UDF") that returned PostgresSQL row ids corresponding to the records that matched a given Solr query in a specific table. The set of results was then applied as a filter on the original table before executing the remainder of the native PostgreSQL operations.

Figure 10:
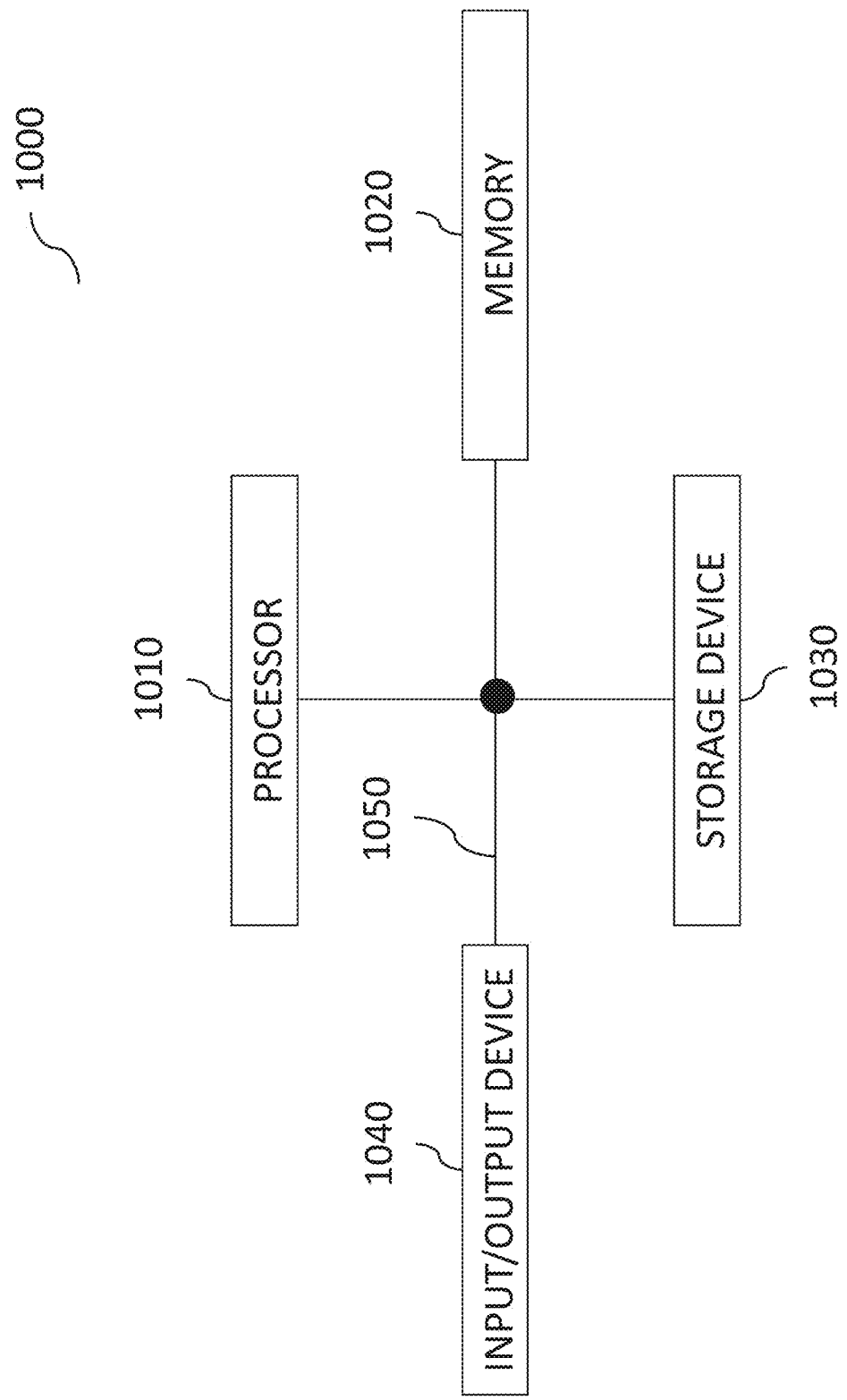
FIG. 10 illustrates an exemplary system, according to some implementations of the current subject matter.

In some implementations, the current subject matter can be configured to be implemented in a system 1000, as shown in FIG. 10. The system 1000 can include a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 1000. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit.

The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/output device 1040 can include a keyboard and/or pointing device. In alternate implementations, the input/output device 1040 can include a display unit for displaying graphical user interfaces.

Figure 11:
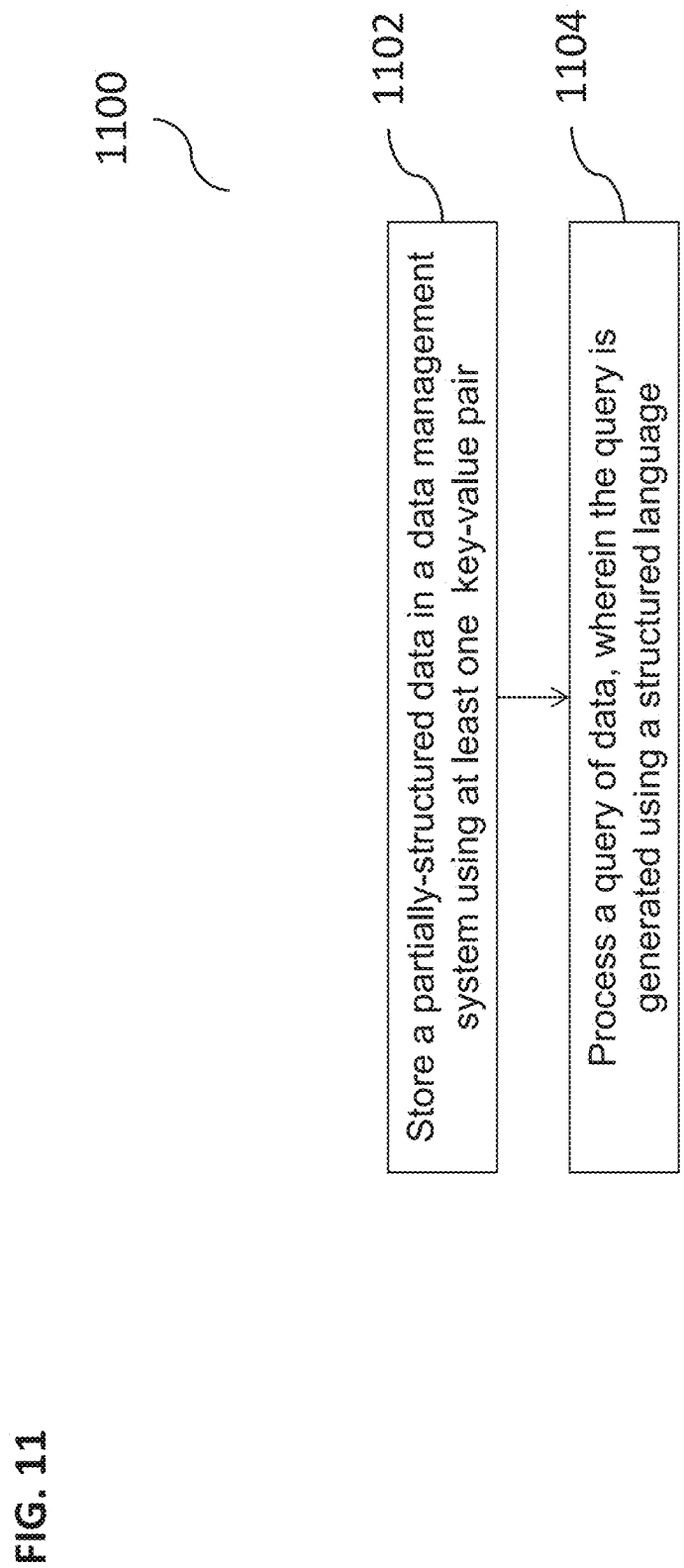
FIG. 11 illustrates an exemplary method, according to some implementations of the current subject matter.

FIG. 11 illustrates an exemplary method 1100 for storing and/or providing access to partially structured data, i.e., data that can be stored in one or more physical columns and/or one or more virtual columns, as discussed above. In some implementations, the current subject matter system can provide an ability to store key-value pairs associated with a dataset of documents (which can be parsed into such key-value pairs) in a plurality of tables containing rows and columns. The current subject matter system can further allow querying such partially structured data using a structured language query (e.g., an SQL, and/or any other structured query language). Thus, at 1102, the partially-structured data can be stored in a data management system using at least one key-value pair. At 1104, the data management system can process a query of data, where the query is generated using a structured language. In some implementations, the data management system can be a relational database management system and/or any other system.

In some implementations, the current subject matter can include one or more of the following optional features. In some implementations, the method can include generating an interface containing a plurality of columns of data, wherein each column in the plurality of columns corresponds to a key in a plurality of stored key-value pairs, and generating, using the generated interface, the query of data using the structured language. The interface can be a tabular view that can be presented to a user. The generated query can refer to at least one column in the generated interface. The column can refer to at least one of the following: a physical column stored in the data management system and a virtual column stored in an overflow column in the data management system.

The data management system can store data using a plurality of keys and can include a plurality of physical columns and an overflow column. Each physical column can store data identified by a key in the plurality of keys and the overflow column can store data in a serialized format. The received query can be processed to determine whether the queried data is stored in at least one of the following: at least one physical column in the plurality of physical columns and an overflow column, and a dataset responsive to the query can be generated. The dataset can include data obtained from at least one of the at least one physical column and the overflow column.

In some implementations, the processing can include materializing at least one virtual column by extracting data corresponding to at least one key identified in the query.

In some implementations, the data management system can store data in a plurality of tables, each table in the plurality of tables containing logically associated data. The processing can further include joining the plurality of tables. The data management system can also store data in a single table containing an array of data objects within the data.

In some implementations, the data management system can store data based on at least one document schema. The document schema can identify the stored data based on at least one of the following parameters: at least one key corresponding to the data, a type of data, a number of occurrences of each key corresponding to the data, whether the data is stored in the at least one physical column in the plurality of physical columns, whether the data is stored in the overflow column, and a flag. The key can correspond to the data and the type of data form a global dictionary table (which can be accessed first) containing information about data previously stored in and/or recently loaded into a plurality of tables of the data management system. The parameters can include the number of occurrences of each key corresponding to the data, whether the data is stored in the at least one physical column in the plurality of physical columns, whether the data is stored in the overflow column, and the flag are specific to each table in a plurality of tables of the data management system. The flag can indicate that the data corresponding to a key in the plurality of keys is stored in at least one of the following: the at least one physical column and the overflow column.

In some implementations, the serialized format can include a header containing a number of data attributes stored in the at least one virtual column, an attribute identifier for each data attribute of data stored in the at least one virtual column, and an offset location of each value of data corresponding to each data attribute stored in the in the at least one virtual column. The processing can further include de-serializing data stored in the serialized format in the at least one virtual column by obtaining, based on a key contained from the received query, an attribute identifier corresponding to the data stored in the at least one virtual column, determining, based on the obtained attribute identifier, an offset location of each value of data corresponding to the obtained attribute identifier, and retrieving, based on the determined offset location, a value of data, wherein the retrieved data corresponds to the key contained in the received query.

In some implementations, the data can be loaded for storage in the data management system by validating syntax of the data being loaded into the data management system and serializing the loaded data prior to storing the data in the data management system into the serialized data format, wherein the serialization of loaded data includes determination of at least one presence, type and sparsity of the keys in the loaded data.

In some implementations, the method can further include determining, by the data management system, whether to store data stored in the overflow column in the at least one physical column. The determination can also include determining at least one of the following: a sparsity of at least one attribute, a purity of at least one attribute, a cardinality of at least one attribute, and an attribute schema corresponding to the data stored in the overflow column. The data can be stored in the overflow column and corresponding to attributes having relatively low sparsity is moved for storage into the at least one physical column. The data can be stored in the overflow column and corresponding to attributes having relatively low purity is retained for storage into the overflow column and is not moved for storage in the at least one physical column.

In some implementations, based on a determination that data corresponding to a key in the plurality of keys is stored in the at least one physical column and the overflow column, the data stored in the overflow column can be moved for storage in the at least one physical column.

In some implementations, the processing can include determining whether the received query includes a reference to the at least one virtual column and/or the at least one physical column, modifying the reference to include a key extraction over the overflow column, when the reference is to the at least one virtual column a key in the plurality of keys, wherein the overflow column stores data corresponding to the same key.

The data can include at least one of the following: JSON data, a binary-encoded serialization of JSON data, Extensible Markup Language data, universal resource locator query string data, and Resource Description Framework data. The query can be a structured query language query.

The systems and methods disclosed herein can be embodied in various forms including, for example, a data processor, such as a computer, that also includes a database, digital electronic circuitry, firmware, and/or software, or combinations thereof. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising:
   storing a partially-structured data in a data management system using at least one key-value pair;
   processing, using the data management system, a query of data, wherein the query is generated using a structured language;
   generating an interface containing a plurality of columns of data, wherein each column in the plurality of columns corresponds to a key in a plurality of stored key-value pairs; and
   generating, using the generated interface, the query of data using the structured language;
   wherein the generated query refers to at least one column in the generated interface;
   wherein the plurality of columns includes a physical column stored in the data management system and a virtual column stored in an overflow column in the data management system, the overflow column contains at least one key-value pair having a key that is not associated with the physical column stored in the data management system; and wherein at least one of the storing, the processing, the generating an interface, and the generating the query of data is performed using at least one processor of at least one computing system.

2. The method according to claim 1, wherein the interface is a tabular view presented to a user.

3. The method according to claim 1, wherein the data management system stores the data using a plurality of keys and includes a plurality of physical columns and an overflow column, wherein each physical column stores data identified by a key in the plurality of keys and the overflow column stores data in a serialized format, the overflow column containing at least one virtual column.

4. The method according to claim 3, wherein the processing further comprises:

determining whether the queried data is stored in at least one of the following: at least one physical column in the plurality of physical columns and the overflow column; and generating, by the data management system, a dataset responsive to the query, wherein the dataset includes data obtained from at least one of: the at least one physical column and the overflow column.

5. The method according to claim 4, wherein the processing further comprises materializing the at least one virtual column by extracting data corresponding to at least one key identified in the query.

6. The method according to claim 4, wherein the data management system stores data in a plurality of tables, each table in the plurality of tables containing logically associated data, wherein the processing further comprises joining the plurality of tables.

7. The method according to claim 4, wherein the data management system stores data in a single table containing an array of data objects within the data.

8. The method according to claim 4, wherein the data management system stores data based on at least one document schema.

9. The method according to claim 8, where the at least one document schema identifies the stored data based on at least one of the following parameters: at least one key corresponding to the data, a type of data, a number of occurrences of each key corresponding to the data, whether the data is stored in the at least one physical column in the plurality of physical columns, whether the data is stored in the overflow column, and a flag.

10. The method according to claim 9, wherein the at least one key corresponding to the data and the type of data form a global dictionary table containing information about data previously stored in and/or recently loaded into a plurality of tables of the data management system.

11. The method according to claim 9, wherein the parameters including the number of occurrences of each key corresponding to the data, whether the data is stored in the at least one physical column in the plurality of physical columns, whether the data is stored in the overflow column, and the flag are specific to each table in a plurality of tables of the data management system.

12. The method according to claim 9, wherein the flag indicates that the data corresponding to a key in the plurality of keys is stored in at least one of the following: the at least one physical column and the overflow column.

13. The method according to claim 4, wherein the serialized format includes a header containing a number of data attributes stored in the at least one virtual column, an attribute identifier for each data attribute of data stored in the at least one virtual column, and an offset location of each value of data corresponding to each data attribute stored in the in the at least one virtual column.

14. The method according to claim 13, wherein the processing further comprises de-serializing data stored in the serialized format in the overflow column by obtaining, based on a key contained from the received query, an attribute identifier corresponding to the data stored in the at least one virtual column;

determining, based on the obtained attribute identifier, an offset location of each value of data corresponding to the obtained attribute identifier; and retrieving, based on the determined offset location, a value of data, wherein the retrieved data corresponds to the key contained in the received query.

15. The method according to claim 4, wherein the data is loaded for storage in the data management system by validating syntax of the data being loaded into the data management system; and serializing the loaded data prior to storing the data in the data management system into the serialized data format, wherein the serialization of loaded data includes determination of at least one presence, type and sparsity of the keys in the loaded data.

16. The method according to claim 4, further comprising determining, by the data management system, whether to store data stored in the overflow column in the at least one physical column.

17. The method according to claim 16, wherein the determining further comprises determining at least one of the following a sparsity of at least one attribute, a purity of at least one attribute, a cardinality of at least one attribute, and an attribute schema corresponding to the data stored in the overflow column.

18. The method according to claim 17, wherein data stored in the overflow column and corresponding to attributes having low sparsity is moved for storage into the at least one physical column.

19. The method according to claim 17, wherein data stored in the overflow column and corresponding to attributes having low purity is retained for storage into the overflow column and is not moved for storage in the at least one physical column.

20. The method according to claim 12, wherein based on a determination that data corresponding to a key in the plurality of keys is stored in the at least one physical column and the overllow column, the data stored in the overflow column is moved for storage in the at least one physical column.

21. The method according to claim 4, wherein the processing further comprises determining whether the received query includes a reference to the at least one virtual column;

modifying the reference to include a key extraction over the overllow column when the reference to the at least one virtual column is a key in the plurality of keys, wherein the overllow column stores data corresponding to the same key.

22. The method according to claim 1, wherein the data includes at least one of the following: a JavaScript Object Notation data, a binary-encoded serialization of JavaScript Object Notation data, Extensible Markup Language data, universal resource locator query string data, and Resource Description Framework data.

23. The method according to claim 1, wherein the query is a structured query language query.

24. A computer program product comprising a non-transitory machine-readable medium storing instructions that, when executed by at least one programmable processor, cause the at least one programmable processor to perform operations comprising:
   storing a partially-structured data in a data management system using at least one key-value pair; and processing, using the data management system, a query of data, wherein the query is generated using a structured language;
   generating an interface containing a plurality of columns of data, wherein each column in the plurality of columns corresponds to a key in a plurality of stored key-value pairs; and
   generating, using the generated interface, the query of data using the structured language; wherein the generated query refers to at least one column in the generated interface; and wherein the plurality of columns includes a physical column stored in the data management system and a virtual column stored in an overflow column in the data management system, the overflow column contains at least one key-value pair having a key that is not associated with the physical column stored in the data management system.

25. A system comprising:
   at least one programmable processor; and
   a machine-readable medium storing instructions that, when executed by the at least one programmable processor, cause the at least one programmable processor to perform operations comprising:
   storing a partially-structured data in a data management system using at least one key-value pair; and
   processing, using the data management system, a query of data, wherein the query is generated using a structured language;
   generating an interface containing a plurality of columns of data, wherein each column in the plurality of columns corresponds to a key in a plurality of stored key-value pairs; and
   generating, using the generated interface, the query of data using the structured language;
   wherein the generated query refers to at least one column m the generated interface; and
   wherein the plurality of columns includes a physical column stored in the data management system and a virtual column stored in an overflow column in the data management system, the overflow column contains at least one key-value pair having a key that is not associated with the physical column stored in the data management system.

* * * * *